US011946467B2

(12) United States Patent
Dellutri et al.

(10) Patent No.: US 11,946,467 B2
(45) Date of Patent: Apr. 2, 2024

(54) DEVICE AND METHOD FOR MEASURING THE FLOW OF A FLUID IN A TUBE MOVED BY A PERISTALTIC PUMP

(71) Applicant: STMICROELECTRONICS S.r.l., Agrate Brianza (IT)

(72) Inventors: Michele Alessio Dellutri, San Gregorio di Catania (IT); Fabio Passaniti, Syracuse (IT); Enrico Rosario Alessi, Catania (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 197 days.

(21) Appl. No.: 17/519,294

(22) Filed: Nov. 4, 2021

(65) Prior Publication Data
US 2022/0145873 A1    May 12, 2022

(30) Foreign Application Priority Data

Nov. 9, 2020   (IT) .......................... 102020000026666

(51) Int. Cl.
*F04B 43/12* (2006.01)
*F04B 49/06* (2006.01)

(52) U.S. Cl.
CPC .............. *F04B 43/12* (2013.01); *F04B 49/06* (2013.01)

(58) Field of Classification Search
CPC ...... F04B 43/12; F04B 43/1253; F04B 49/06; F04B 49/065
See application file for complete search history.

(56) References Cited

U.S. PATENT DOCUMENTS

| 5,215,450 A * | 6/1993 | Tamari | ................. A61M 1/74 138/119 |
| 2002/0062105 A1* | 5/2002 | Tanner | ............ A61M 5/14232 604/131 |
| 2007/0106218 A1* | 5/2007 | Yodfat | ............ A61M 5/14232 604/152 |

(Continued)

FOREIGN PATENT DOCUMENTS

| EP | 0274768 A1 | 7/1988 |
| EP | 2818128 A1 | 12/2014 |

(Continued)

OTHER PUBLICATIONS

Yan, Yong, "Mass flow measurement of bulk solids in pneumatic pipelines," *Measurement Science and Technology*, vol. 7, 1996, p. 1687-1706.

*Primary Examiner* — Philip E Stimpert
(74) *Attorney, Agent, or Firm* — Seed IP Law Group LLP

(57) ABSTRACT

Various embodiments provide a device for measuring the flow of fluid inside a tube moved by a peristaltic pump is provided with: a detection electrode arrangement coupled to the tube to detect an electrostatic charge variation originated by the mechanical action of the peristaltic pump on the tube; a signal processing stage, electrically coupled to the detection electrode arrangement to generate an electrical charge variation signal; and a processing unit, coupled to the signal processing stage to receive and process in the frequency domain the electrical charge variation signal to obtain information on the flow of a fluid that flows through the tube based on the analysis of frequency characteristics of the electrical charge variation signal.

18 Claims, 8 Drawing Sheets

(56) References Cited

U.S. PATENT DOCUMENTS

2014/0232516 A1  8/2014  Stivoric et al.
2016/0342781 A1  11/2016  Jeon

FOREIGN PATENT DOCUMENTS

| EP | 2980609 A1 | | 2/2016 |
|---|---|---|---|
| EP | 3040019 A1 | | 7/2016 |
| JP | 2018105622 A | * | 7/2018 |
| KR | 1020110061750 A | | 6/2011 |
| WO | WO 2011080191 A1 | | 7/2011 |

* cited by examiner

Amplitude

| | | HARM #1 | HARM #2 | HARM #3 | HARM #4 |
|---|---|---|---|---|---|
| RPM | 0 | 0 | 0 | 0 | 0 |
| | 15 | 47 | 15 | 7 | 1 |
| | 30 | 97 | 104 | 22 | 13 |
| | 45 | 491 | 142 | 13 | 16 |
| | 60 | 1143 | 236 | 33 | 23 |
| | 75 | 1359 | 254 | 29 | 53 |
| | 90 | 1749 | 282 | 74 | 60 |

FIG.9A

Amplitude

| | | HARM #1 | HARM #2 | HARM #3 | HARM #4 |
|---|---|---|---|---|---|
| RPM | 0 | 0 | 0 | 0 | 0 |
| | 15 | 407 | 0.3 | 0.6 | 0.35 |
| | 30 | 527 | 3 | 1.5 | 1.9 |
| | 45 | 1638 | 6 | 1 | 1.4 |
| | 60 | 1719 | 11 | 2.8 | 2.3 |
| | 75 | 1878 | 10 | 1.5 | 2 |
| | 90 | 2393 | 22 | 2.2 | 1.8 |

FIG.9B

DEVICE AND METHOD FOR MEASURING THE FLOW OF A FLUID IN A TUBE MOVED BY A PERISTALTIC PUMP

BACKGROUND

Technical Field

The present solution relates to a device and a method for measuring the flow of a fluid in a tube, in particular the fluid being moved by a peristaltic pump.

Description of the Related Art

Devices for measuring the flow of a fluid inside a duct or tube (so-called flowmeters) based on various measurement techniques or principles are known; for example, electromagnetic, infrared, ultrasonic flowmeters, or flowmeters based on the use of pressure sensors are known.

For example, the operating principle of an electromagnetic flowmeter is based on the Faraday's law of electromagnetic induction. When a conductive fluid flows through a magnetic field generated by the sensor, between a corresponding pair of electrodes facing the tube in which the fluid flows, an electromotive force is generated proportional to the flow, perpendicular to the direction of the same flow and to the magnetic field; the electrical output signal is modulated by the flow speed.

The document "Mass flow measurement of bulk solids in pneumatic pipelines," Yong Yan, IOP Publishing Ltd, Measurement Science and Technology, Volume 7, No. 12 (1996) 1687-1706 describes various techniques for measuring the flow of solid elements moving through pneumatic pipelines. For example, this document describes the possibility of electrostatically charging solid particles in a first chamber, by applying a high voltage, and detecting a corresponding electrical signal in a second chamber, indicative of the flow of the same particles.

In general, the aforementioned flowmeters are rather expensive devices, utilize sophisticated electronics with high energy consumption solutions and also have a size that does not allow miniaturization and thus their application where there is not enough space for installation.

Fluidic systems are also known wherein the movement of liquid is based on the use of peristaltic pumps.

Peristaltic pumps generally comprise a rotor having a certain number of "roller" elements coupled to its outer circumference, for externally compressing a duct or flexible tube wherein the fluid to be moved is located. As a result of the rotation of the rotor, the compressed part of the tube is pinched and closed, thus forcing the fluid to be pumped to move through the tube.

Peristaltic pumps do not have parts that come into contact with the fluid inside the tube, thus excluding possible contamination of the fluid by the pump, or of the pump by the same fluid. This characteristic makes peristaltic pumps particularly suitable for use in applications where a high degree of purity and sterility is preferred, for example in the case of transfer or dosage of chemicals for medical or industrial applications, or in the case of food industry and in particular of preparation and packaging of beverages.

In these applications, the measurement of flows even at very low flow rates, for example in the order of a few units or tens of ml per minute, may also be desired, for which common commercial solutions cannot find suitable application.

BRIEF SUMMARY

Various embodiments of the present application provide a solution for measurement of the flow of a fluid in a tube, in particular being moved by a peristaltic pump, which allows the drawbacks of the known solutions to be overcome and in particular allows even low flow rates to be detected with limited consumption, costs and size.

According to the present solution, a device and a method for measuring a flow are provided.

BRIEF DESCRIPTION OF THE SEVERAL VIEWS OF THE DRAWINGS

For a better understanding of the disclosure, embodiments thereof are now described, purely by way of non-limiting example and with reference to the accompanying drawings, wherein:

FIG. 9A and FIG. 9B each show a table of values of further quantities associated with the calibration operations;

DETAILED DESCRIPTION

As will be described in detail hereinafter, an aspect of the present solution envisages, for measuring the flow of a fluid inside a tube moved by a peristaltic pump, a measuring device based on the use of an electrostatic charge variation sensor and on the processing of a charge variation signal detected by this sensor.

In proximity to the contact (or "friction") area on which the roller elements of the peristaltic pump act, electrostatic charges are generated on the surface of the duct or tube due to the triboelectric effect. In detail, the electrostatic charge is generated on the inner walls of the tube due to the continuous compression and decompression of the same tube due to pinching by the roller elements of the peristaltic pump and to the subsequent release. At a generic time (t), due to the rotation of the rotor, a tube portion is compressed; at the immediately following time (t+1) the rotor shifts its compression action to the following section of the tube, causing the decompression of the previous section. Due to the triboelectric effect, electrical charges pass from one contact surface to the next, canceling their initial neutrality and thus causing both surfaces to be charged. The presence of a more or less conductive fluid (air, demineralized water, salt water, etc.) inside the tube may also affect this process of generating electrostatic charges, modifying dynamics and amplitude thereof.

The electrostatic variation caused by the action of the peristaltic pump on the tube and propagated along the tube itself may therefore be measured through a suitable electrode arrangement coupled to the tube downstream of the aforementioned contact area with the peristaltic pump, for the generation of an electrical charge variation signal that, through a cable, may be provided to a signal processing stage.

As will be discussed in detail hereinafter, the present inventors has realized that it is possible to obtain, from processing of this electrical charge variation signal, in particular from the analysis of frequency characteristics thereof, measurement and/or monitoring information of the flow of the fluid inside the tube.

Figure 1:
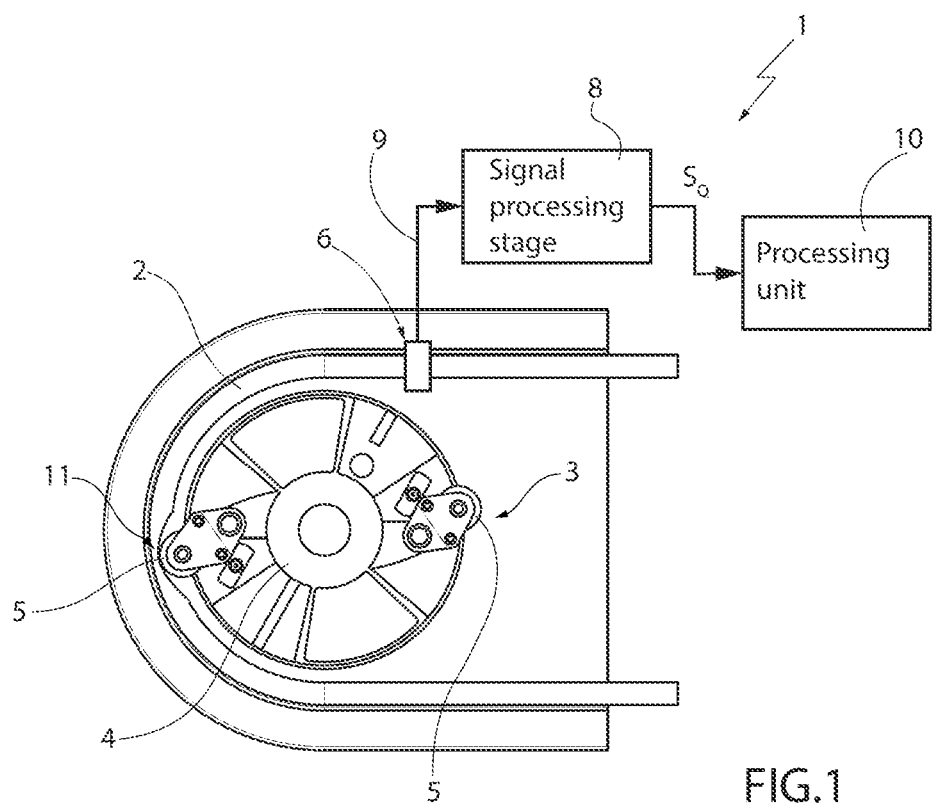
FIG. 1 schematically shows a device for measuring the flow of a fluid in a tube moved by a peristaltic pump, according to an aspect of the present solution.

Referring to FIG. 1, a measuring device 1 for measuring the flow of fluid inside a tube 2, for example a silicone flexible hose, is now described according to an aspect of the present solution.

As shown schematically, a peristaltic pump 3 is coupled to the tube 2, forming a fluidic circuit with the same tube 2, and comprises a rotor 4, which carries roller elements 5 at an outer surface thereof. These roller elements 5 are designed to come into contact with the tube 2 to exert a compression action on the same tube 2 at a contact area (e.g., area 11 on the tube 2), during rotation of the rotor 4.

The measuring device 1 comprises a detection electrode arrangement 6 coupled to the tube 2, downstream of the aforementioned contact area with respect to the flow of the fluid; preferably, this detection electrode arrangement 6 is placed in proximity to the contact area, that is in proximity to the contact area between the roller elements 5 of the peristaltic pump 3 and the tube 2, for detection of the aforementioned electrostatic charge variation.

For example, the detection electrode arrangement 6 may be installed at a distance of a few (up to a few tens of) centimeters from the body of the peristaltic pump 3. Longer distances may in fact attenuate the electrical charge variation signal; shorter distances may instead favor the induction of spurious signals, due to movements of mechanical parts of the peristaltic pump 3 (not relevant for the measurement purposes) and/or to fields generated by a power supply thereof.

Figure 2:
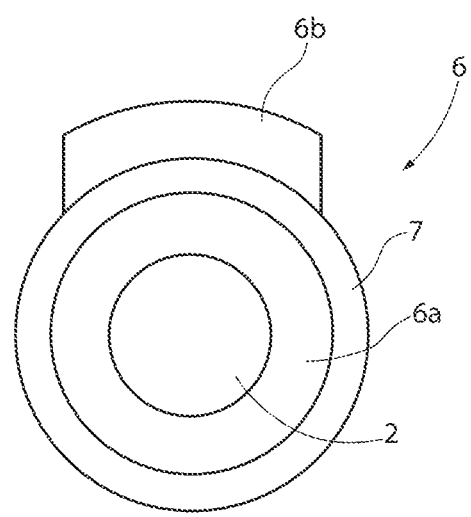
FIG. 2 schematically illustrates a detection electrode arrangement coupled to the tube of the device of FIG. 1.

In a possible embodiment, shown in FIG. 2, the detection electrode arrangement 6 may comprise: a first detection electrode 6a, having a ring shape and arranged around the tube 2 downstream of and in proximity to the aforementioned contact area, for example by means of suitable constraint means; and a second detection electrode 6b, placed above the first detection electrode 6a, separated from the latter by a dielectric region 7. In the illustrated embodiment, the aforementioned dielectric region 7 also has a ring shape, on and corresponding to the first detection electrode 6a, whereas the second detection electrode 6b has a different configuration, for example substantially rectangular on the same dielectric region 7.

As shown in the aforementioned FIG. 1, the measuring device 1 further comprises: a signal processing stage 8, electrically coupled to the detection electrode arrangement 6 through an electric cable 9 and forming, as discussed in detail hereinafter, a high impedance stage for the generation of an electrical charge variation signal $S_Q$; and a processing unit 10, coupled to the output of the aforementioned signal processing stage 8 having circuitry for receiving and suitably processing the electrical charge variation signal $S_Q$ to obtain information on the flow of the fluid that flows through the tube 2.

The processing unit 10 may comprise, for example, a microcontroller, a microprocessor, a DSP (Digital Signal Processor), or an MLC (Machine Learning Core) processor residing in an ASIC (Application Specific Integrated Circuit) electronic circuit.

Figure 3:
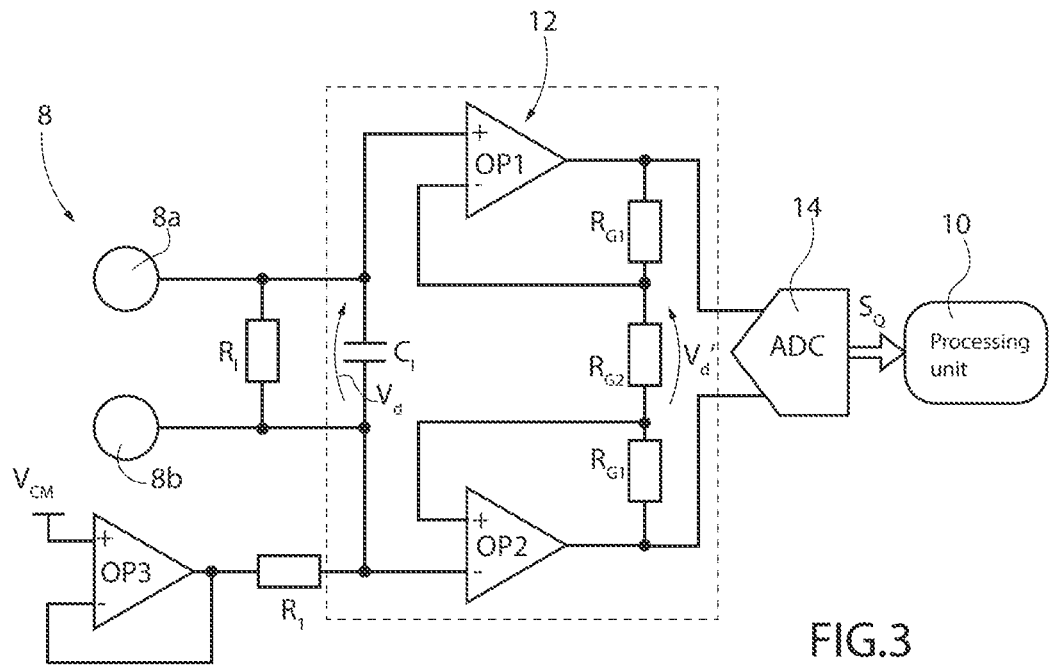
FIG. 3 shows a possible embodiment of a signal processing stage in the device of FIG. 1.

FIG. 3 illustrates an exemplary and non-limiting embodiment of the aforementioned signal processing stage 8, which has two differential inputs 8a, 8b electrically connected to the above first and second detection electrodes 6a, 6b through the electric cable 9.

The signal processing stage 8 comprises an instrumentation amplifier 12, having a differential input coupled to the aforementioned differential inputs 8a, 8b, between which an input capacitor $C_I$ and an input resistor $R_I$ are connected, in parallel to each other. During operation, an input voltage $V_d$ across the input capacitor $C_I$ therefore varies due to the aforementioned electrostatic charge generation process caused by the triboelectric effect following the action of the peristaltic pump 3.

In particular, as on the other hand will become apparent, the first detection electrode 6a, arranged closer to the tube 2, is designed to mainly detect the charge variation due to the effect of the peristaltic pump 3 on the tube 2, as well as detecting interfering effects present in the surrounding environment (e.g., due to low frequency electrical fields of the power supply voltage); whereas the second detection electrode 6b is designed to mainly detect the aforementioned interfering effects. Given the differential configuration of the detection electrodes 6a, 6b, the input voltage $V_d$ is therefore substantially immune to the aforementioned noise.

The instrumentation amplifier 12 is formed by two operational amplifiers OP1 and OP2, having non-inverting input terminals connected respectively to the first and to the second differential inputs 8a, 8b and inverting terminals connected to each other through a gain resistor $R_{G2}$.

A biasing stage (buffer) OP3 biases the instrumentation amplifier 12 to a common mode voltage $V_{CM}$, through a resistor $R_1$ coupled to the second differential input 8b.

The output terminals of the operational amplifiers OP1 and OP2 are connected to the respective inverting input terminals through a respective gain resistor $R_{G1}$; an output voltage $V_d'$ is present between the same output terminals.

As will be apparent, the gain Ad of the instrumentation amplifier 12 is equal to $(1+2 \cdot R_{G1}/R_{G2})$; therefore, the aforementioned output voltage $V_d'$ is equal to: $V_d \cdot (1+2 \cdot R_{G1}/R_{G2})$.

The components of the instrumentation amplifier 12 are chosen such that the same instrumentation amplifier 12 has a reduced noise and a high impedance (for example of the order of $10^9$ Ohm) in its passband (for example comprised between 0 and 500 Hz).

The aforementioned output voltage $V_d'$ is provided to an analog-to-digital converter (ADC) 14, which outputs the aforementioned charge variation signal $S_Q$ for the processing unit 10. This charge variation signal $S_Q$ is, for example, a high resolution digital stream (e.g., 16 or 24 bits).

According to a different embodiment, having an analog-to-digital converter 14 with suitable characteristics (e.g., differential input, high input impedance, high resolution, dynamic range optimized for the quantities to be measured, low noise) the instrumentation amplifier 12 may be omitted, in this case the input voltage $V_d$ being supplied directly to the input of the analog-to-digital converter 14.

The processing unit 10, as will be described in detail hereinafter, is configured to receive the charge variation signal $S_Q$ and process it to obtain information relating to the speed and flow of the fluid inside the tube 2; as will be disclosed hereinafter, the processing unit 10 is also designed to obtain information about the type of fluid present inside the tube 2.

In general, the operations carried out by the processing unit 10 envisage: transforming and processing the charge variation signal $S_Q$ in the frequency domain, for the determination of characteristics of the main harmonics (in terms of the corresponding frequency and amplitude); and determining the type of fluid circulating in the tube 2 based on the aforementioned characteristics of the main harmonics and also based on the characteristics of the fluidic circuit formed by the tube 2 and by the peristaltic pump 3.

According to an aspect of the present solution, the processing of the charge variation signal $S_Q$ is also based on a preliminary calibration operation of the fluidic circuit comprising the tube 2, the fluid flowing through the same tube 2 and the peristaltic pump 3. As will be discussed in detail hereinafter, this calibration operation provides for determining the characteristics of the most significant harmonics of the charge variation signal $S_Q$ at various and specific rotation speeds, expressed in RPM (Revolutions Per Minute), of the peristaltic pump 3, and with various types of fluids inside the tube 2 (for example, in a possible implementation, in the presence of water, or air, circulating in the same tube 2).

The present inventors have realized that, as shown by the plots of FIGS. 4A, 4B, 5A, and 5B, the main harmonics of the charge variation signal $S_Q$ have substantially the same frequency values, at the various rotation speeds of the peristaltic pump 3, regardless of the type of fluid that flows inside the tube 2 (for example, both in the presence of water and air); the frequency of the harmonics is in fact dependent on the characteristics of the peristaltic pump 3 and in particular on the rotation speed thereof.

Figure 4A:
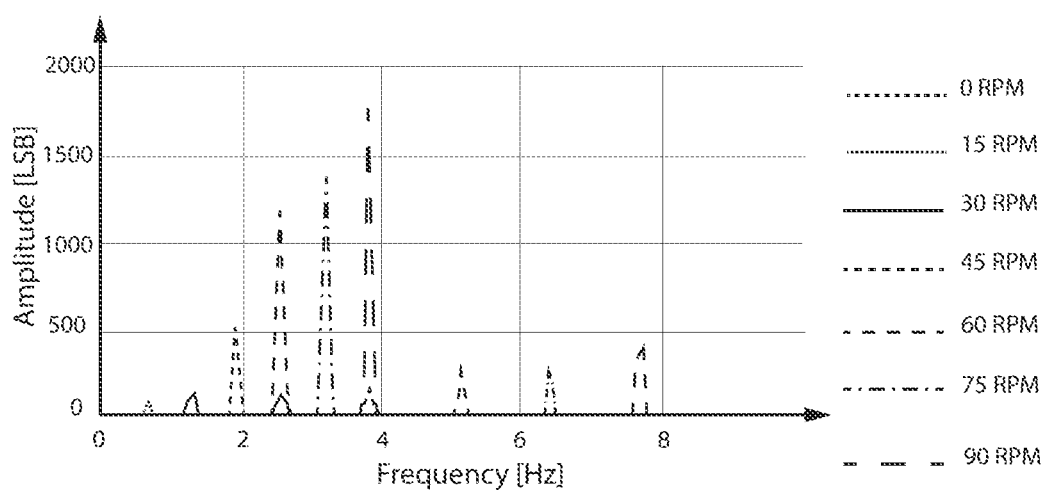
FIGS. 4A, 4B, 5A, 5B, 6A, 6B, and 6C show plots of quantities processed by a processing unit of the device of FIG. 1.
Figure 4B:
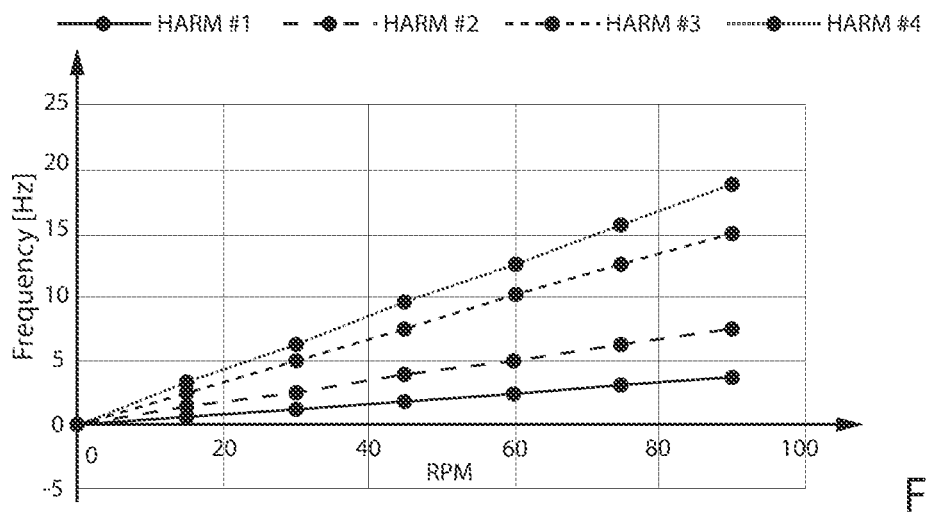
Figure 5A:
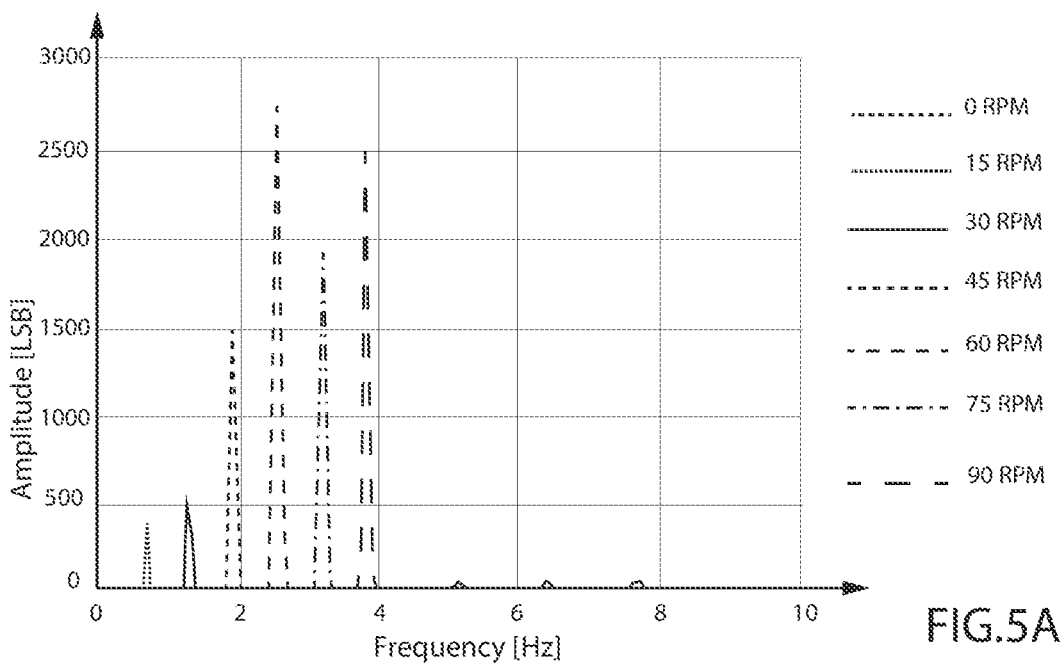
Figure 5B:
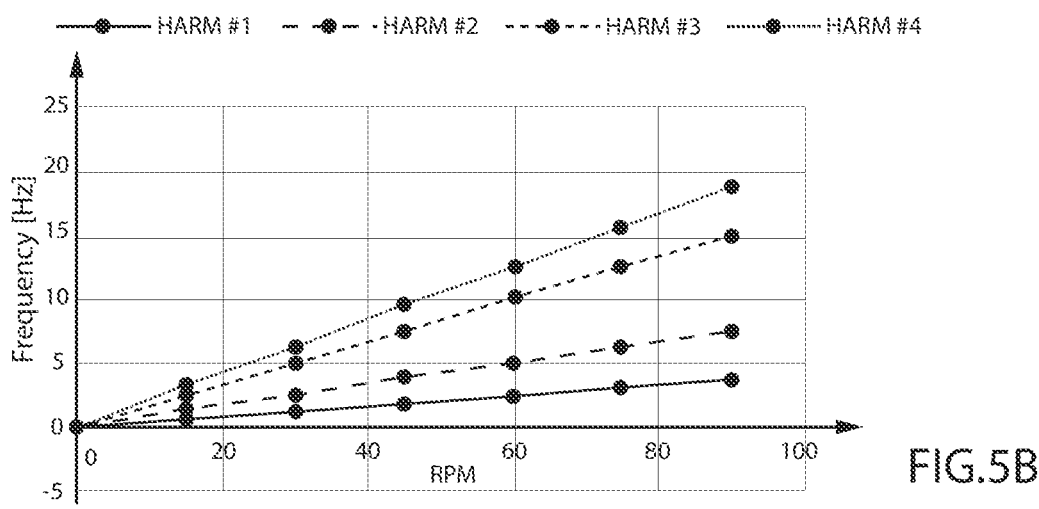

FIGS. 4A and 5A show (for the cases of water and of air, respectively, present in the tube 2) the harmonics of the charge variation signal $S_Q$ (in terms of frequency and amplitude) at various rotation speed values of the peristaltic pump 3 (expressed in RPM).

The present inventors have realized that it is possible to determine a linear relationship between the frequency of the various harmonics of the charge variation signal $S_Q$ and the rotation speed of the peristaltic pump 3 (as shown in FIGS. 4B and 5B, again for the cases of water and air, respectively, in the tube 2). By way of example, the four most significant harmonics HARM #1, HARM #2, HARM #3, HARM #4, that is, the ones having the greatest information content (in other words, the four harmonics with the greatest amplitudes) are considered, among the various harmonics of the charge variation signal $S_Q$.

The present inventors have also found that the amplitude of the aforementioned most significant harmonics of the charge variation signal $S_Q$ at the various rotation speeds of the peristaltic pump 3 is indicative of the type of fluid that flows in the tube 2. In particular, reference may be made to a relative amplitude, that is, to the ratios between the amplitudes of the various harmonics, or to the pattern (or trend) defined by the amplitudes of the same harmonics.

Figure 6A:
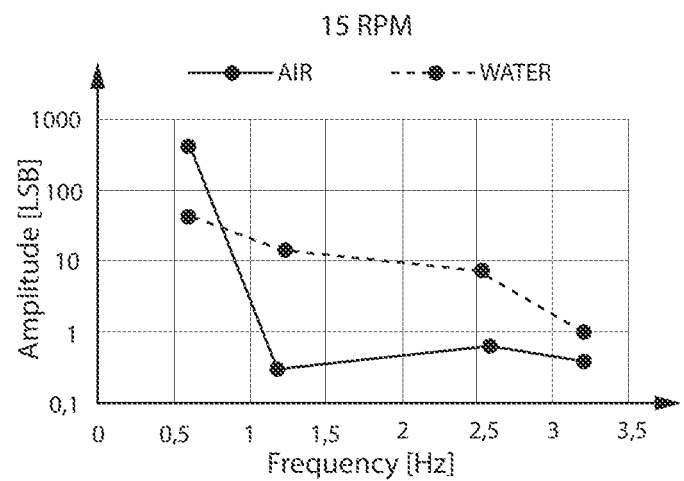
Figure 6B:
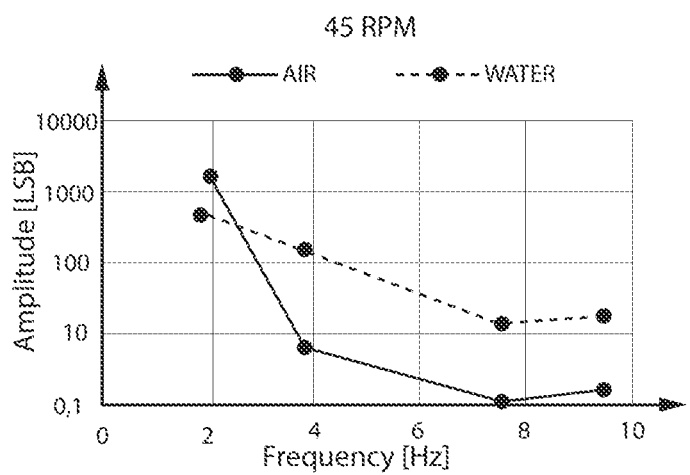
Figure 6C:
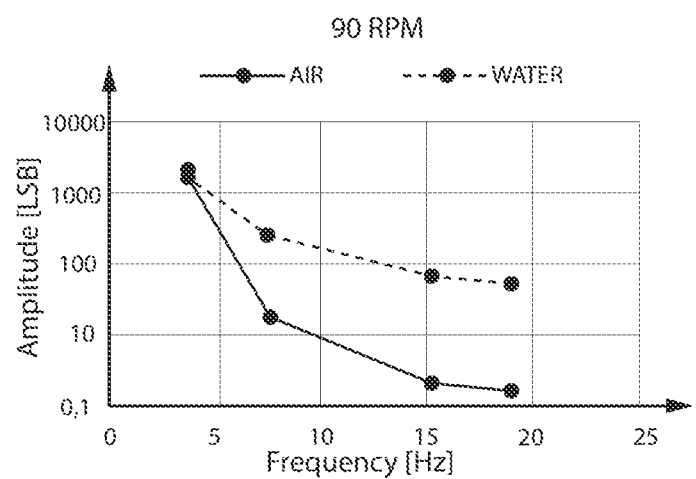

In this regard, FIGS. 6A, 6B, and 6C show the amplitude values of the main harmonics of the charge variation signal $S_Q$, both in case of water and in case of air in the tube 2 (again, four most significant harmonics are considered, by way of example, at the frequencies indicated by the "dots"), for three exemplary rotation speed values of the peristaltic pump 3 (in the examples, FIG. 6A is for 15 RPM, FIG. 6B is for 45 RPM, and FIG. 6C is for 90 RPM). From the plots it is apparent that the amplitude trends at the various rotation speeds are significantly different depending on the type of fluid, in the example water or air, being present in the tube 2.

Figure 7:
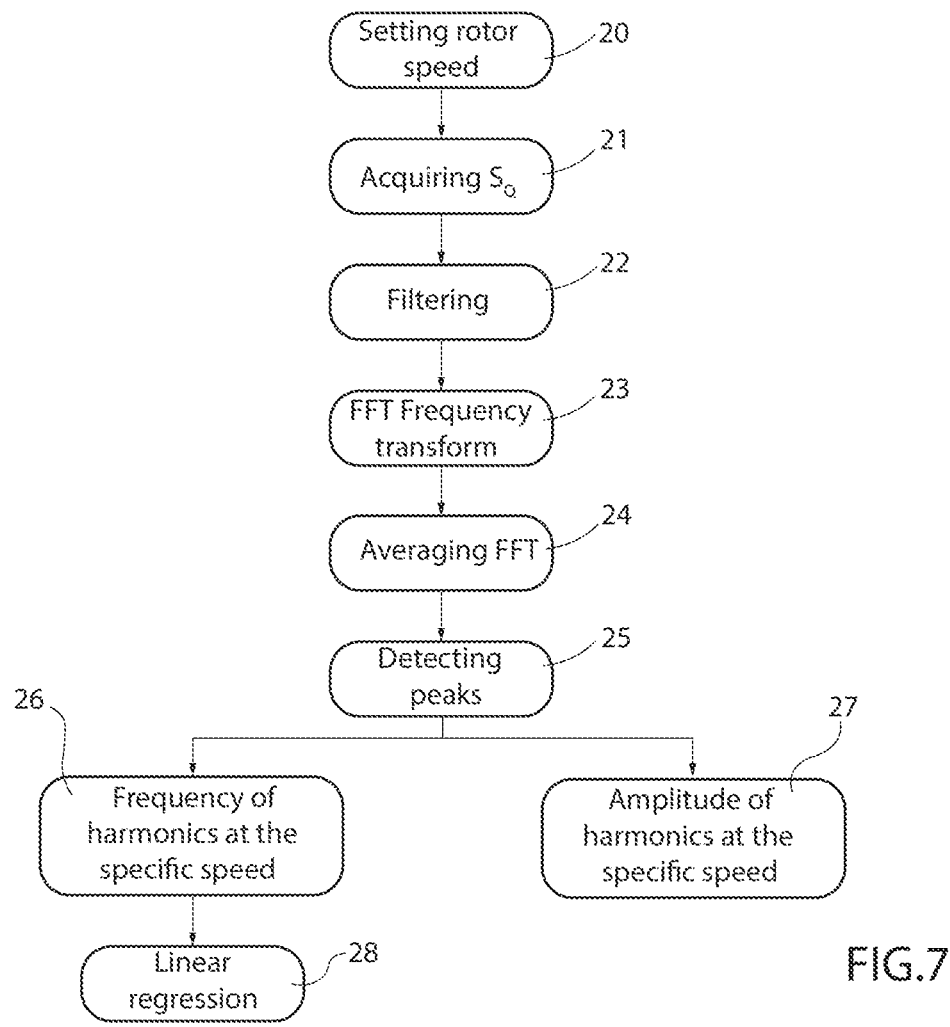
FIG. 7 is a flowchart relating to calibration operations associated with the device of FIG. 1.

With reference to FIG. 7, preliminary calibration operations of the fluidic system comprising the tube 2, the peristaltic pump 3, the fluid inside the tube 2 (for example water or air) and the aforementioned detection electrode arrangement 6 are now described in detail, these operations are for determining the spectral characteristics of the charge variation signal $S_Q$ at the various rotation speeds of the rotor 4 of the peristaltic pump 3.

Initially, as shown at step 20, the rotation speed of the rotor 4 of the peristaltic pump 3 is set to a specific speed for a first desired calibration value (e.g., a minimum value); it should be noted that this operation will then be repeated for each desired calibration value for the rotation speed of the rotor 4 of the peristaltic pump 3 (e.g., up to a maximum value).

Then, step 21, the charge variation signal $S_Q$ provided by the signal processing stage 8 is acquired, for example, with an acquisition frequency of about 200 Hz.

This charge variation signal $S_Q$ is subject to filtering, for example of a low-pass type (for example, with cut-off frequency at 30 Hz), to remove noise components (for example, noise components at a power supply frequency, 50 Hz or 60 Hz), in step 22, and the transformation in the frequency domain thereof is then carried out, as shown in step 23. In particular, a FFT Fourier transform of the charge variation signal $S_Q$ is performed to obtain the frequency spectrum thereof.

The FFT Fourier transform is then subject to an averaging operation, in order to remove spurious frequencies associated with noise, at step 24. In detail, this averaging operation may be performed with respect to time: each calculated spectrum (FFT) is, in this case, inserted in a row of a two-dimensional array structure, which acts as a scrolling buffer (when the array is filled, a new row is inserted at the top and the oldest is deleted). In this case, each column of the array represents the trend of a harmonic over time: the first column is the lower frequency harmonic, and the last column is the higher frequency harmonic. Upon inserting each new spectrum, a row containing the average of the values, calculated on each column, is generated; this row will have the same number of columns as the acquired spectra, and each of its elements will therefore represent the average amplitude of each harmonic.

Thereafter, step 25, the peaks of the charge variation signal $S_Q$ in the frequency spectrum are identified (using a suitable threshold identification operation), these peaks corresponding to the most significant harmonics of the charge variation signal $S_Q$. In a possible implementation, for example, four peaks and four corresponding most significant harmonics of the charge variation signal $S_Q$ are identified. Any number of peaks may be detected.

For each of the identified peaks and for the corresponding harmonic, as indicated in steps 26 and 27, the frequency values and the amplitude values, respectively, thereof (the amplitude values, as indicated hereinabove, being dependent on the type of fluid, as opposed to the frequency values, which are dependent on the rotation speed of the peristaltic pump 3) are determined.

By repeating the discussed steps (steps 20-27) for each desired calibration value for the rotation speed of the rotor 4 of the peristaltic pump 3 (i.e., for each desired rotation speed of the peristaltic pump 3), a set of frequency and amplitude values are obtained for the various harmonics considered, for each of a plurality of rotation speeds of the rotor 4.

This set of values may be expressed and stored in the form of tables, respectively for the frequency and amplitude values for the various harmonics and for the various rotation speeds.

Then, the calibration process ends, as shown in step 28, with the generation of a corresponding calibration curve for each of the most significant harmonics of the charge variation signal $S_Q$, for example through a linear regression operation of the acquired frequency values at the various rotation speeds of the peristaltic pump 3.

Figure 8:
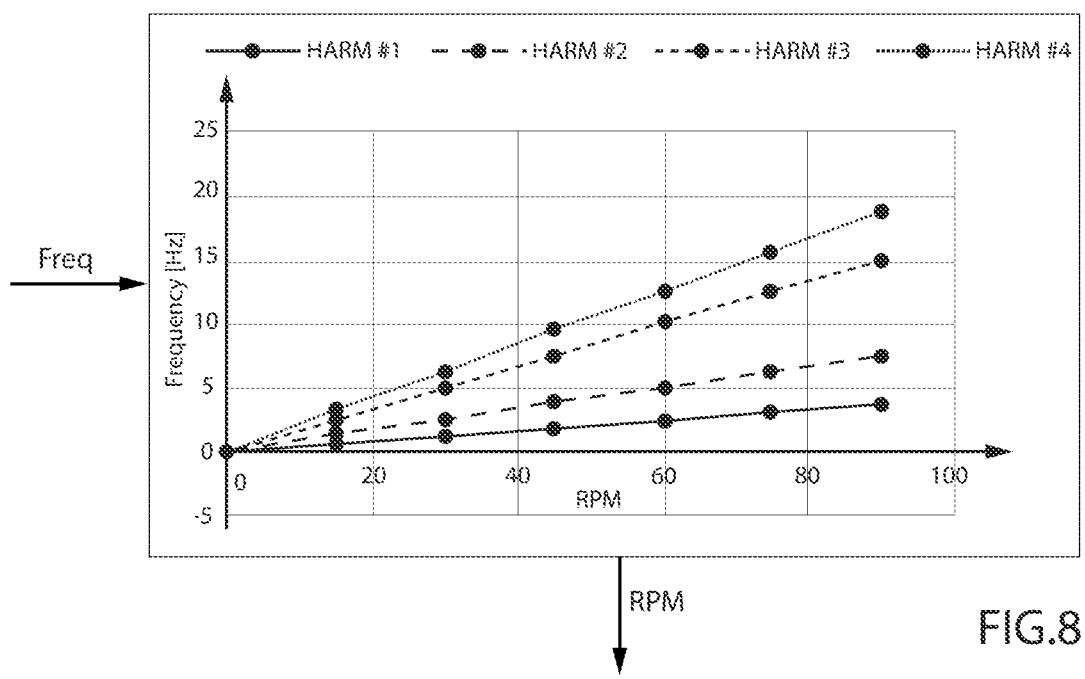
FIG. 8 is a plot of quantities relating to the calibration operations.

As shown in FIG. 8, these calibration curves show the linear trend of the frequency value of the aforementioned most significant harmonics (in the example, again the four most significant harmonics HARM #1, HARM #2, HARM #3, HARM #4), as the rotation speed (RPM) of the rotor 4 of the peristaltic pump 3 varies.

In particular, for each calibration curve, the slope and the intercept of the interpolating straight line are calculated (for example through the aforementioned linear regression operation) and stored.

The aforementioned calibration operations may be performed by the processing unit 10 or by a different calibration apparatus, the set of calibration data (the aforementioned frequency and amplitude tables and the aforementioned calibration curves) being subsequently suitably stored in the same processing unit 10 for subsequent use during actual flow measurement steps.

Advantageously, multiple sets of calibration data may be stored in the same processing unit 10, for example depending on the different types of fluid (for example water or air) that may be present in the tube 2, or on different configurations or characteristics of the same tube 2 and/or of the peristaltic pump 3. FIG. 9A shows, purely by way of example, a table of amplitude values for the various considered harmonics (HARM #1, HARM #2, HARM #3, HARM #4) and for the various rotation speeds in case water is present in the tube 2. FIG. 9B shows, purely by way of example, a table of amplitude values for the various considered harmonics (HARM #1, HARM #2, HARM #3, HARM #4) and for the various rotation speeds in case air is present in the tube 2. As previously indicated, similar tables may be determined for the frequency values and for the various types of fluid in the tube 2.

Figure 10:
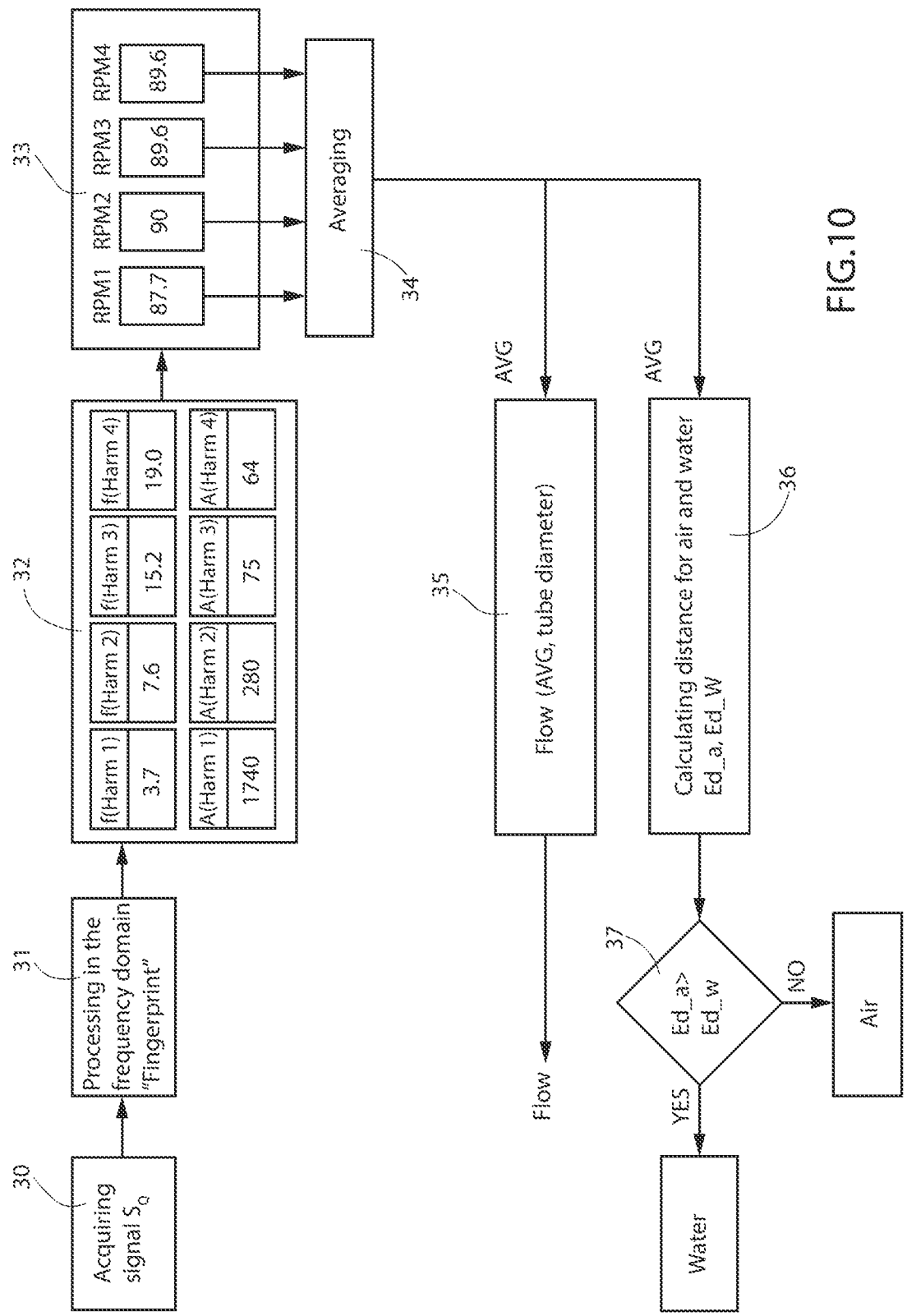
FIG. 10 is a diagram relating to flow measurement operations in the device of FIG. 1.

With reference to FIG. 10, flow measurement operations carried out by the processing unit 10 on the basis of the processing of the charge variation signal $S_Q$ are now described in detail.

In a first step 30, the charge variation signal $S_Q$ provided by the signal processing stage 8 is acquired, during the actual operation of the peristaltic pump 3 and of the associated fluidic circuit.

The aforementioned charge variation signal $S_Q$ is then transformed and processed in the frequency domain, step 31, to obtain the so-called "fingerprint," and in particular to obtain the frequency and amplitude values of the most significant harmonics (advantageously, the same harmonics that have been characterized during the preliminary calibration process, through similar processing operations). For example, the frequency and amplitude values of the four harmonics with the greatest amplitudes are obtained. It is noted that the frequency and amplitude values for any number of harmonics may be obtained.

In this manner, a table of spectral values (frequencies and amplitudes of the significant harmonics) is obtained, depicted by way of example in step 32.

At this point, using the calibration curves for the most significant harmonics determined during the calibration process (see also the aforementioned FIG. 8), the corresponding speed value of the rotor 4 of the peristaltic pump 3 (RPM) is associated with the frequency value measured for each harmonic, as shown by way of example in step 33 (wherein the speeds for the four most significant harmonics are indicated with RPM1, RPM2, RPM3, RPM4). Stated differently, a corresponding speed value of the rotor 4 of the peristaltic pump 3 is determined for each of the frequency values obtained in step 32. For example, in regards to frequency value Harm 1 (3.7) in step 32, the corresponding speed value RPM1 (87.7) is the speed value corresponding to the frequency value 3.7 in the curve HARM #1 in FIG. 8. In regards to frequency value Harm 2 (7.6) in step 32, the corresponding speed value RPM1 (90) is the speed value corresponding to the frequency value 7.6 in the curve HARM #2 in FIG. 8. In regards to frequency value Harm 3 (15.2) in step 32, the corresponding speed value RPM1 (89.6) is the speed value corresponding to the frequency value 15.2 in the curve HARM #3 in FIG. 8. In regards to frequency value Harm 4 (19) in step 32, the corresponding speed value RPM1 (89.6) is the speed value corresponding to the frequency value 19 in the curve HARM #4 in FIG. 8.

Subsequently, in step 34, the rotation speed values of the rotor 4 thus determined for the various harmonics (RPM1, RPM2, RPM3, RPM4) are averaged, obtaining an average rotation speed value AVG. This average may be a classic average (which, in the shown example, returns a value of 89.2 RPM) or a weighted average, in case assigning different weights to the various harmonics might be advantageous (for example, in the event that the frequency values determined during the calibration step are considered more or less reliable, for example because of being affected by noise or other variability).

At this point, step 35, using the average rotation speed value AVG and considering the design data of the peristaltic pump 3 (for example, parameters or characteristics of the peristaltic pump as reported in a corresponding datasheet, such as a relationship between rotation speed and flow rate of the peristaltic pump) and the dimensions, such as the diameter, of the tube 2, the value of flow rate inside the same tube 2 is determined.

In particular, also in the case of the design data of the peristaltic pump 3, a linear regression operation may be used to obtain a straight line equation from the information provided for a few rotation speeds (RPM), allowing the flow rate value to be seamlessly obtained for any rotation speed value of the rotor 4.

Furthermore, in a concurrent time with step 35, as indicated in step 36, using the average rotation speed value AVG and the calibration values stored for the amplitude of the most significant harmonics at the same rotation speed as (or at the closest rotation speed to) the average rotation speed value AVG, the distances (for example of an Euclidean type) between the calibration values (e.g., calibration values shown in FIGS. 9A and 9B) for the different fluids (in the example, air and water) and the amplitude values obtained from the processing of the "fingerprint" of the charge variation signal $S_Q$ (see steps 31 and 32) are calculated. For example, using the calibration values for water shown in FIG. 9A and assuming the average rotation speed value AVG is approximately 90 RPM, the distance (Ed_w) between the amplitude of Harm 2 in step 32 (280) and the corresponding calibration value for HARM #2 in FIG. 9A (282) is 2 (the absolute difference between 280 and 282). Similarly, using the calibration values for air shown in FIG. 9B and assuming the average rotation speed value AVG is approximately 90 RPM, the distance (Ed_a) between the amplitude of Harm 2 in step 32 (280) and the corresponding calibration value for HARM #2 in FIG. 9A (22) is 258 (the absolute difference between 280 and 258). The distances between the amplitude values obtained in step 32 and their corresponding calibration values are calculated for each type of fluid possibly present in the tube 2 (e.g., air and water). In one embodiment, in case of multiple harmonics, the Euclidean distance calculated for air (Ed_a) is an average or sum of the absolute distances between the amplitude values in step 32 and their respective air calibration values, and the Euclidean distance calculated for water (Ed_w) is an average or sum of absolute distances between the amplitude values in step 32 and their respective water calibration values.

It should be noted that, for each measured rotation speed value not present in the calibration data, the values of the amplitudes at the immediately preceding and successive calibration speeds (for which the amplitude values of the harmonics are known) are known. Therefore, it will be possible to determine equivalent calibration amplitudes at the measured speeds through a linear interpolation, so as to proceed as previously described (in this case, calculating the distances between the equivalent calibration values determined from the interpolation and the amplitude values obtained from processing of the "fingerprint").

A comparison is then performed, step 37, between the Euclidean distance values calculated for the various fluids, in order to determine which fluid actually flows through the tube 2; in particular, the fluid for which the Euclidean distance is smaller may be selected.

In the example, in the aforementioned step 37, the comparison provides for verifying which of the Euclidean distance calculated for air (Ed_a) and for water (Ed_w) is smaller, in order to verify the presence of water or air inside the tube 2. For example, if the Euclidean distance calculated for air (Ed_a) is larger than the Euclidean distance calculated for water (Ed_w), the processing unit 10 determines water flows through the tube 2. If the Euclidean distance calculated for air (Ed_a) is not larger than (i.e., is less than) the Euclidean distance calculated for water (Ed_w), the processing unit 10 determines air flows through the tube 2.

It should be noted that the aforementioned operations may be repeated several times over time, for example at regular intervals in order to perform a repeated measurement, in particular a monitoring of the flow of fluid inside the tube 2.

Figure 11:
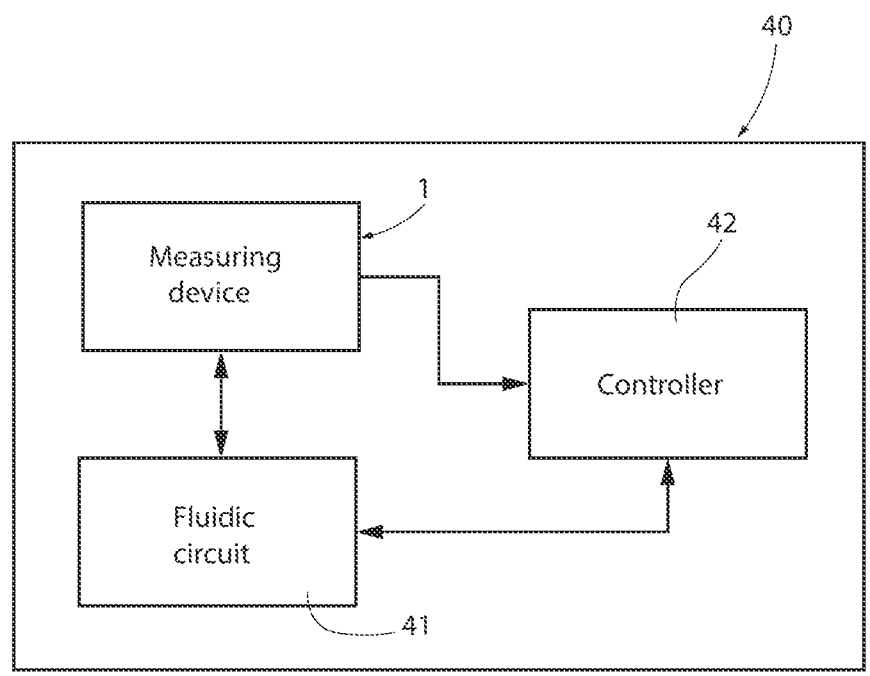
FIG. 11 is a schematic block diagram of an electric apparatus wherein the measuring device may be used.

With reference to FIG. 11, an electric apparatus 40 is now described, comprising: the fluidic circuit, indicated herein as a whole with 41, formed by the peristaltic pump 3, the tube 2 and the fluid contained therein; the measuring device 1 previously described in detail; and a main controller 42 (a microcontroller, a microprocessor or a similar digital processing unit), for controlling the general operation of the electric apparatus 40, also based on the flow measurements and monitoring performed by the aforementioned measuring device 1.

The electric apparatus 40 is configured for example for the transfer or dosage of chemicals for medical or industrial applications, for the preparation and packaging of beverages for food use or similar applications.

In a possible embodiment, the processing unit 10 of the measuring device 1 may be implemented by, or coincide with, the main controller 42 of the electric apparatus 40.

The advantages achieved by the present solution are clear from the previous description.

In any case, it is again emphasized that the measuring device 1 provides for a passive detection (without any active energy source), utilizing extremely low energy consumption (for example of the order of 1 µA).

The measuring device 1 has a limited size, of the order of a few mm for the detection electrode arrangement 6 to be coupled to the fluidic circuit. Furthermore, the same measuring device 1 is non-invasive and may therefore be installed and used in a short time (after calibration for the particular implemented pump model), without any intervention on the pump or on the associated electric apparatus or the shutdown thereof.

The same measuring device 1 may be advantageously used in various applications, also being easily suitable for so-called "after-market" or "retro-fit" installations and "custom" processing of existing devices, that is, to provide apparatuses initially not provided with this functionality with the flow measurement and monitoring functionality. In fact, it is easy applying the detection electrode arrangement 6 to the corresponding fluidic circuit and installing the processing unit 10 coupled through the electric cable 9 to the same detection electrode arrangement 6.

Furthermore, it is advantageous the possibility of identifying the type of fluid circulating in the fluidic circuit, for example by identifying the presence of air in the tube 2, offered by the measuring device 1. This also allows predictive maintenance evaluations to be implemented, since the presence of air (or of a different unwanted fluid identified in the fluidic circuit) may be associated with a failure or malfunction of the corresponding electric apparatus and in particular of the peristaltic pump 3.

It is also emphasized that the measuring device 1 advantageously allows the actual flow of the fluid circulating in the fluidic circuit to be verified, even in the event that the rotor 4 of the peristaltic pump 3 rotates correctly but there are problems in the peristaltic action of pinching of the tube 2; the measurement technique is in fact associated with the effects of the pinching of the tube 2 by the peristaltic pump 3 and not with the rotation of the rotor 4 of the same pump.

Finally, it is clear that modifications and variations may be made to what described and illustrated without thereby departing from the scope of protection of the present disclosure.

In particular, the present solution applies to any type of peristaltic pump 3 and for any configuration and arrangement of the roller elements 5 thereof. Different types of tube 2, different materials and different fluids circulating in the associated fluidic circuit may also be provided.

Furthermore, different configurations (for example in terms of shape, placing and shielding of the electrodes) may be provided for the detection electrode arrangement 6 to be coupled to the tube 2, which in any case allow the detection of the electrostatic charge variation associated with the action of the peristaltic pump 3 on the same tube 2.

Various embodiments disclosed herein provide a measuring device (1) for measuring the flow of fluid inside a tube (2) moved by a peristaltic pump (3). The measuring device includes a detection electrode arrangement (6) coupled to the tube (2) and configured to detect an electrostatic charge variation originated by an action of said peristaltic pump (3) on said tube (2); a signal processing stage (8), electrically coupled to the detection electrode arrangement (6) and configured to generate an electrical charge variation signal (SQ); and a processing unit (10), coupled to the signal processing stage (8) and configured to receive and process in the frequency domain the electrical charge variation signal (SQ) to obtain flow information for the fluid flowing through the tube (2) based on the analysis of frequency characteristics of said electrical charge variation signal (SQ).

The processing unit (10) is configured to determine frequency values of harmonics of the electrical charge variation signal (SQ); obtain, from said frequency values, a rotation speed (AVG) of said peristaltic pump (3); and determine said flow information based on said rotation speed (AVG) and dimensional characteristics of said tube (2).

The processing unit (10) is configured to obtain said rotation speed (AVG) of said peristaltic pump (3) from said frequency values based on calibration data acquired during a preliminary calibration phase, wherein said calibration data comprise calibration curves associating corresponding rotation speed values of the peristaltic pump (3) with the frequency values of the harmonics of the electrical charge variation signal (SQ).

The processing unit (10) is configured to associate corresponding rotation speed values of the peristaltic pump (3) with the frequency values of the harmonics of the electrical charge variation signal (SQ) based on said calibration curves; and determine said rotation speed (AVG) of the peristaltic pump (3) as an average of said corresponding rotation speed values.

The calibration curves are a linear regression of calibration frequencies of respective harmonics of the electrical charge variation signal (SQ) acquired at different calibration values of the rotation speed of the peristaltic pump (3); said calibration curves being indicative of a linear trend of the frequency of the harmonics with respect to the rotation speed of the peristaltic pump (3).

The processing unit (10) is configured to determine said flow information based on said rotation speed (AVG) and a dimension of said tube (2) and based on design characteristics of said peristaltic pump (3).

The processing unit (10) is further configured to determine amplitude values of the harmonics of the electrical charge variation signal (SQ); and obtain, from said amplitude values, information about a type of fluid circulating in the tube (2).

The processing unit (10) is configured to obtain said information about the type of fluid circulating in the tube (2) from said amplitude values based on calibration data acquired during a preliminary calibration step, wherein said calibration data comprise calibration amplitudes of harmonics of the electrical charge variation signal (SQ) acquired at different calibration values of the rotation speed of the peristaltic pump (3) and for different types of fluids circulating in said tube (2).

The processing unit (10) is configured to determine the type of fluid circulating in the tube (2) as the fluid for which a distance between said amplitude values and the calibration amplitudes at said rotation speed (AVG) is smaller.

The detection electrode arrangement (6) is arranged at a contact area between roller elements (5) of the peristaltic pump (3) and the tube (2), downstream of the same contact area.

The detection electrode arrangement (6) comprises a first detection electrode (6a), having a ring shape and arranged around the tube (2) at said contact area; and a second detection electrode (6b), placed above the first detection electrode (6a), separated from the first detection electrode (6a) by a dielectric region (7).

The signal processing stage (8) comprises a high-impedance instrumentation amplifier (12) having a differential input coupled to said detection electrode arrangement (6); and an analog-to-digital converter (14) coupled at the output to said instrumentation amplifier (12) to provide said electrical charge variation signal (SQ).

Various embodiments disclosed herein also provide an electric apparatus (40) comprising the measuring device (1) according to any of the embodiments discussed above; a fluidic circuit (41), formed by the peristaltic pump (3), the tube (2) and the fluid contained in said tube (2); and a main controller (42), configured to control the operation of the electric apparatus (40), also depending on flow measurements performed by said measuring device (1).

Various embodiments disclosed herein also provide a method for measuring (1) the flow of a fluid inside a tube (2) moved by a peristaltic pump (3), comprising detecting an electrostatic charge variation originated by an action of said peristaltic pump (3) on said tube (2); generating an electrical charge variation signal (SQ) based on said electrostatic charge variation; and processing the electrical charge variation signal (SQ) in the frequency domain to obtain flow information for the fluid flowing through the tube (2) based on the analysis of frequency characteristics of said electrical charge variation signal (SQ).

The method further comprises determining frequency values of harmonics of the electrical charge variation signal (SQ); obtaining, from said frequency values, a rotation speed (AVG) of said peristaltic pump (3); and determining said flow information based on said rotation speed (AVG) and dimensional characteristics of said tube (2).

The method further comprises obtaining the rotation speed (AVG) of said peristaltic pump (3) from said frequency values based on calibration data acquired during a preliminary calibration phase, wherein said calibration data comprise calibration curves associating corresponding rotation speed values of the peristaltic pump (3) with the frequency values of the harmonics of the electrical charge variation signal (SQ).

The method further comprises determining amplitude values of the harmonics of the electrical charge variation signal (SQ); and obtaining, from said amplitude values, information about a type of fluid circulating in the tube (2).

The method further comprises obtaining said information about the type of fluid circulating in the tube (2) from said amplitude values based on calibration data acquired during a preliminary calibration phase; wherein said calibration data comprise calibration amplitudes of the harmonics of the electrical charge variation signal (SQ) acquired at different calibration values of the rotation speed of the peristaltic pump (3) and for different types of fluids circulating in said tube (2).

The method further comprises determining the type of fluid circulating in the tube (2) as the fluid for which a distance between said amplitude values and the calibration amplitudes at said rotation speed (AVG) is smaller.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device configured to measure a flow of fluid inside a tube moved by a peristaltic pump, the device comprising:

a detection electrode arrangement coupled to the tube, and configured to detect an electrostatic charge variation originated by an action of the peristaltic pump on the tube;
a signal processing circuitry coupled to the detection electrode arrangement, and configured to generate an electrical charge variation signal based on the electrostatic charge variation; and
a processor coupled to the signal processing circuitry, and configured to:
receive and process, in a frequency domain, the electrical charge variation signal to obtain flow information for the fluid based on frequency characteristics of the electrical charge variation signal;
determine amplitude values of harmonics of the electrical charge variation signal; and
determine a type of the fluid based on the amplitude values of the harmonics.

2. The device according to claim 1, wherein the processor is configured to:
determine frequency values of the harmonics of the electrical charge variation signal;
obtain, from the frequency values, a rotation speed of the peristaltic pump; and
determine the flow information based on the rotation speed and dimensional characteristics of the tube.

3. The device according to claim 2, wherein
the processor is configured to obtain the rotation speed of the peristaltic pump from the frequency values based on calibration data acquired during a preliminary calibration phase, and
the calibration data includes calibration curves associating corresponding rotation speed values of the peristaltic pump with the frequency values of the harmonics of the electrical charge variation signal.

4. The device according to claim 3, wherein the processor is configured to:
associate corresponding rotation speed values of the peristaltic pump with the frequency values of the harmonics of the electrical charge variation signal based on the calibration curves; and
determine the rotation speed of the peristaltic pump as an average of the corresponding rotation speed values.

5. The device according to claim 3, wherein
the calibration curves are a linear regression of calibration frequencies of respective harmonics of the electrical charge variation signal acquired at different calibration values of rotation speed of the peristaltic pump, and
the calibration curves are indicative of a linear trend of frequency of the harmonics with respect to the rotation speed of the peristaltic pump.

6. The device according to claim 2, wherein the processor is configured to determine the flow information based on the rotation speed, a dimension of the tube, and design characteristics of the peristaltic pump.

7. The device according to claim 2, wherein
the processor is configured to obtain the type of the fluid from the amplitude values based on calibration data acquired during a preliminary calibration step, and
the calibration data includes calibration amplitudes of harmonics of the electrical charge variation signal acquired at different calibration values of the rotation speed of the peristaltic pump and for different types of fluids.

8. The device according to claim 7, wherein the processor is configured to determine the type of the fluid as a fluid for which a distance between the amplitude values and the calibration amplitudes at the rotation speed is smaller.

9. The device according to claim 1, wherein the detection electrode arrangement is arranged downstream of a contact area between roller elements of the peristaltic pump and the tube.

10. The device according to claim 9, wherein the detection electrode arrangement includes:
a first detection electrode having a ring shape, and arranged around the tube; and
a second detection electrode placed above the first detection electrode, and separated from the first detection electrode by a dielectric region.

11. The device according to claim 1, wherein the signal processing circuitry includes:
a high-impedance instrumentation amplifier having a differential input coupled to the detection electrode arrangement; and
an analog-to-digital converter coupled at an output to the instrumentation amplifier to provide the electrical charge variation signal.

12. A system, comprising:
a fluidic circuit including a peristaltic pump and a tube;
measuring circuitry configured to measure a flow of fluid inside the tube moved by the peristaltic pump, the measuring circuitry including:
electrodes coupled to the tube, and configured to detect an electrostatic charge variation;
a signal processing circuitry coupled to the electrodes, and configured to generate an electrical charge variation signal based on the electrostatic charge variation; and
a processor coupled to the signal processing circuitry, and configured to:
determine flow information for the fluid based on frequency characteristics of the electrical charge variation signal; and
determine a type of the fluid based on amplitude values of harmonics of the electrical charge variation signal; and
a controller configured to control operation of the system based on the flow information.

13. The system of claim 12, wherein the processor is configured to determine a rotation speed of the peristaltic pump based on frequency values of peaks of the electrical charge variation signal.

14. A method for measuring a flow of a fluid inside a tube moved by a peristaltic pump, the method comprising:
detecting an electrostatic charge variation originated by an action of the peristaltic pump on the tube;
generating an electrical charge variation signal based on the electrostatic charge variation; and
processing the electrical charge variation signal in a frequency domain to obtain flow information for the fluid based on frequency characteristics of the electrical charge variation signal;
determining amplitude values of harmonics of the electrical charge variation signal; and
obtaining, from the amplitude values, information about a type of the fluid based on the amplitude values of the harmonics.

15. The method according to claim 14, further comprising:
determining frequency values of the harmonics of the electrical charge variation signal;
obtaining, from the frequency values, a rotation speed of the peristaltic pump; and determining the flow information based on the rotation speed and dimensional characteristics of the tube.

16. The method according to claim 15, further comprising:
obtaining the rotation speed of the peristaltic pump from the frequency values based on calibration data acquired during a preliminary calibration phase, wherein the calibration data includes calibration curves associating corresponding rotation speed values of the peristaltic pump with the frequency values of the harmonics of the electrical charge variation signal.

17. The method according to claim 15, further comprising:
obtaining the information about the type of the fluid from the amplitude values based on calibration data acquired during a preliminary calibration phase, wherein the calibration data includes calibration amplitudes of the harmonics of the electrical charge variation signal acquired at different calibration values of the rotation speed of the peristaltic pump and for different types of fluids.

18. The method according to claim 17, further comprising:
determining the type of the fluid as the fluid for which a distance between the amplitude values and the calibration amplitudes at the rotation speed is smaller.

* * * * *